METHOD OF WINDING A BALL

Original Filed Oct. 2, 1961 8 Sheets-Sheet 1

INVENTOR.
RUDOLPH G. HOLMAN
BY Nicholas T. Volak
ATTORNEY

METHOD OF WINDING A BALL

Original Filed Oct. 2, 1961 8 Sheets-Sheet 2

INVENTOR.
RUDOLPH G. HOLMAN
BY Nicholas T. Volpe
ATTORNEY

METHOD OF WINDING A BALL

Original Filed Oct. 2, 1961 8 Sheets-Sheet 3

INVENTOR.
RUDOLPH G. HOLMAN
BY
Nicholas T. Vobec
ATTORNEY

METHOD OF WINDING A BALL

Original Filed Oct. 2, 1961 8 Sheets-Sheet 4

INVENTOR.
RUDOLPH G. HOLMAN
BY
Nicholas T. Vokes
ATTORNEY

METHOD OF WINDING A BALL

Original Filed Oct. 2, 1961 8 Sheets-Sheet 5

INVENTOR.
RUDOLPH G. HOLMAN
BY
Nicholas T. Volk
ATTORNEY

METHOD OF WINDING A BALL

Original Filed Oct. 2, 1961 8 Sheets-Sheet 6

INVENTOR.
RUDOLPH G. HOLMAN
BY
Nicholas T. Volak
ATTORNEY

METHOD OF WINDING A BALL

Original Filed Oct. 2, 1961 8 Sheets-Sheet 7

INVENTOR.
RUDOLPH G. HOLMAN
BY Nicholas T. Volpe
ATTORNEY

METHOD OF WINDING A BALL

Original Filed Oct. 2, 1961 8 Sheets-Sheet 8

INVENTOR.
RUDOLPH G. HOLMAN
BY Nicholas T. Volk
ATTORNEY

United States Patent Office

Re. 28,133
Reissued Aug. 27, 1974

28,133

METHOD OF WINDING A BALL

Rudolph G. Holman, Santa Ana, Calif., assignor to AMF, Inc., Jersey City, N.J.

Original No. 3,136,492, dated June 9, 1964, Ser. No. 142,272, Oct. 2, 1961, which is a division of application Ser. No. 635,514, Jan. 22, 1957, now Patent No. 3,071,331, which in turn is a continuation-in-part of abandoned application Ser. No. 513,280, June 6, 1955. Application for reissue Nov. 12, 1973, Ser. No. 414,985
Int. Cl. B65h *54/66*
U.S. Cl. 242—3 12 Claims

Matter enclosed in heavy brackets [ ] appears in the original patent but forms no part of this reissue specification; matter printed in italics indicates the additions made by reissue.

ABSTRACT OF THE DISCLOSURE

*A method of winding a reinforcing strand on the surface of a spherical body by synchronously rotating the body about two axes so that a series of successive turns approximate angularly spaced great circles which intersect at diametrically positioned polar regions, the rotation about one axis being periodically interrupted for a fraction of a revolution of the body about its other axis to displace the polar regions of the succeeding series of turns from the locations of the polar regions of the preceding series of turns.*

This invention relates to a method of rotating and winding, grinding or polishing a spherical body. Although the invention is widely applicable for its basic purpose, it is being initially applied to the production of cord windings on relatively large balls, such as volley balls and basketballs. This particular practice of the invention as disclosed herein by way of example, will provide adequate guidance for those skilled in the art who may have occasion to apply the same principles to other specific purposes, such as rotation of spherical bodies for grinding and polishing their surfaces.

[This application for patent is a continuation-in-part of the parent application Serial No. 635,514, filed January 22, 1957, entitled Ball Winding Apparatus, now Patent No. 3,071,331 issued January 1, 1963.]

*This application for patent is a division of application Ser. No. 635,514 filed Jan. 22, 1957, entitled "Ball Winding Apparatus," now Pat. No. 3,071,331 issued Jan. 1, 1963. Application Ser. No. 635,514 is a Continuation-in-part of application Ser. No. 513,280, entitled "Ball Winding Method and Apparatus," filed June 6, 1955 and now abandoned.*

In the winding of a ball core or an inflated bladder with filamentous material to fabricate a ball for sport and recreational use, the object is to achieve substantially uniform distribution of the windings over the spherical periphery of the ball, with the windings extending in all directions. It is especially important to obtain a uniform distribution of the winding in order to obtain uniform strength of the wall, and also to avoid contour irregularities arising from local concentrations of overlaps of the wound material so as to obtain a smooth spherical surface. It is also structurally important to have the individual turns approach as closely as possible great circles for obtaining maximum strength from the cord. The windings cannot precisely follow great circles, however, since the windings are necessarily serially interconnected and consequently, continual change in winding direction is necessary for acceptable distribution of the individual turns.

The usual approach to the problem of winding a ball is to avoid close control of the individual turns and simply to seek random distribution. Such close control as would produce a recongizable predetermined winding pattern is avoided.

The heretofore prevalent procedure for winding a ball, for example a softball, is to rest the ball structure in a freely rotatable manner on two closely adjacent parallel cylindrical rolls and to rotate the two rolls in the same rotary direction while simultaneously reciprocating the two rolls longitudinally along their axes. The result is far from such control as would produce an ascertainable winding pattern in which identical winding cycles are continually repeated and in which a definite predetermined relationship between the successive cycles may be detected simply by inspecting a finished ball.

A serious disadvantage of this prior art method, moreover, is that adequately random distribution of the windings requires relatively drastic reciprocation of the two rolls for continually drastic bias of the individual windings away from ideal great circle windings. Thus, the individual windings of the finished ball are typically wide departures from great circles rather than approximations of great circles, and great circle turns are approached only infrequently when the two rollers pause at the limits of their ranges of reciprocation.

The broad object of this invention is to provide a novel method for rotating a spherical body for a uniform exposure of the surface of such body to a fixed point, or a moving suface, such as a moving grinding belt, so that such rotation of the spherical body may be used for modifying its surface by winding a cord, or grinding or polishing its surface.

It is also an object of this invention to provide a wound ball with a readily recognizable accurately predetermined winding pattern that results in efficient use of the winding material and achievement of complete uniform coverage with minimum yardage closely approaching great circles in the individual turns.

Each of the successive winding cycles comprises a group of turns closely resembling a series of intersecting great circles of longitude on a globe representing the earth, produced during a "wind" period. Thus, the successive individual turns produced during the wind period, or winding cycle, intersect in two diametrically opposite polar regions of the ball, just as the imaginary lines of longitude intersect at the two opposite polar regions of the earth. The transition from one winding cycle to another is accomplished during a "pause" period, simply by continuing the final turn of a cycle along a small circle, or a true great circle, for a predetermined fraction of a turn, and then repeating the winding cycle with the ensuing successive group of turns intersecting at a new pair of polar regions. The new pair of polar regions is displaced from the preceding pair by an arc of a predetermined length, or sector of a circle, in a predetermined relative direction, the length of the circular arc being determined by the duration of the pause period.

While the new winding pattern may be controlled and predetermined with high precision, it is, nevertheless, exceedingly flexible in that the pattern may be widely varied in variously definitely known respects within the judgment exercised by those skilled in the present art. As will be explained later, there are four distinct variables over which control may be exercised selectively.

The various objects and features of the invention will be apparent from the following detailed description considered with the accompanying drawings having the following:

Figure 9A:
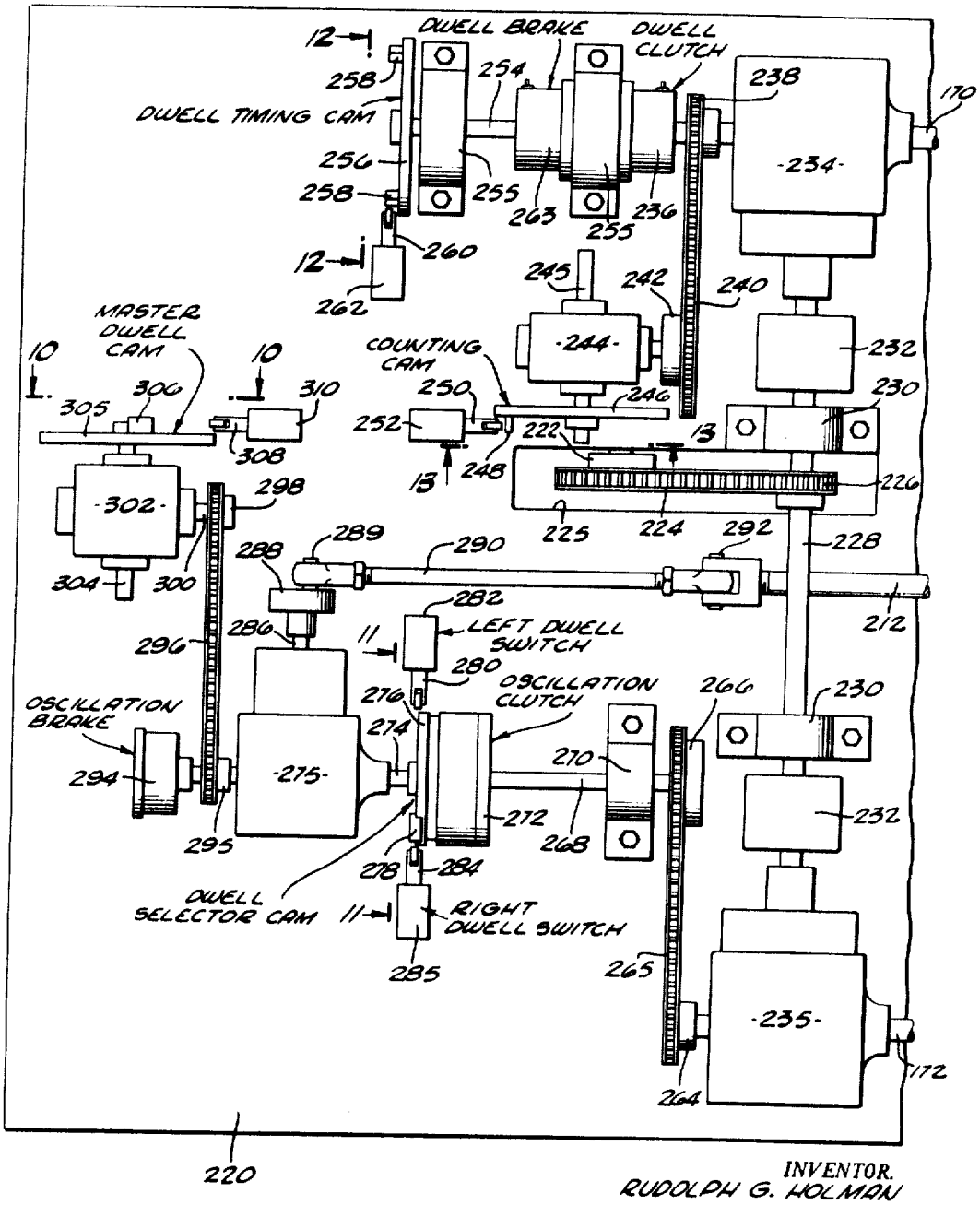
Figure 9B:
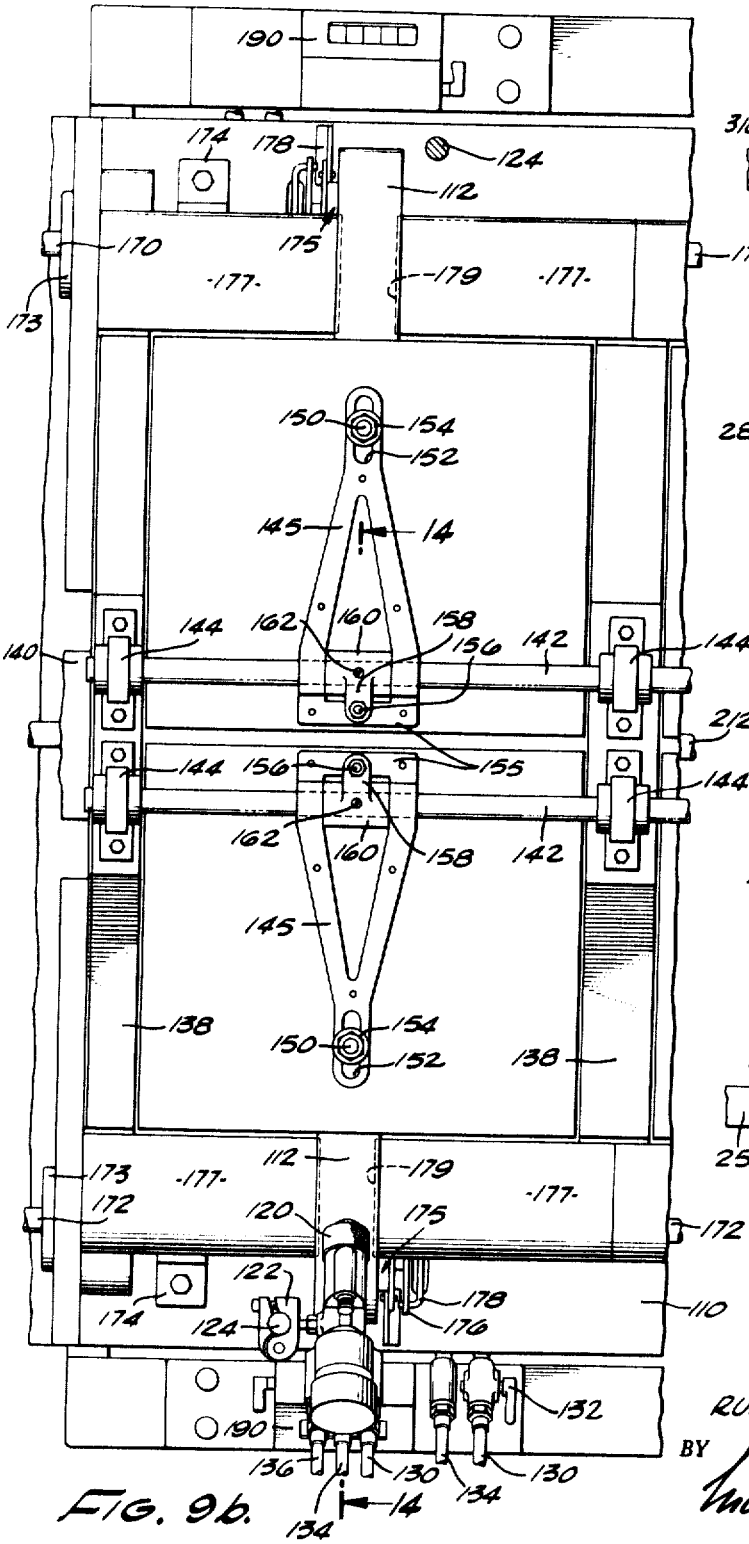
Figure 10:
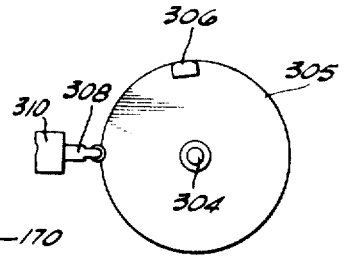
Figure 11:
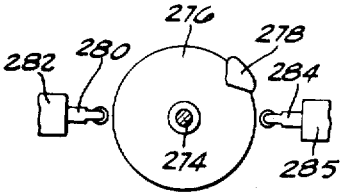
Figure 12:
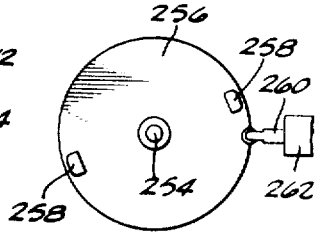
Figure 13:
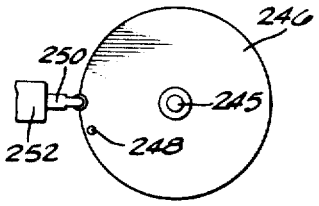
Figures 14, 17:
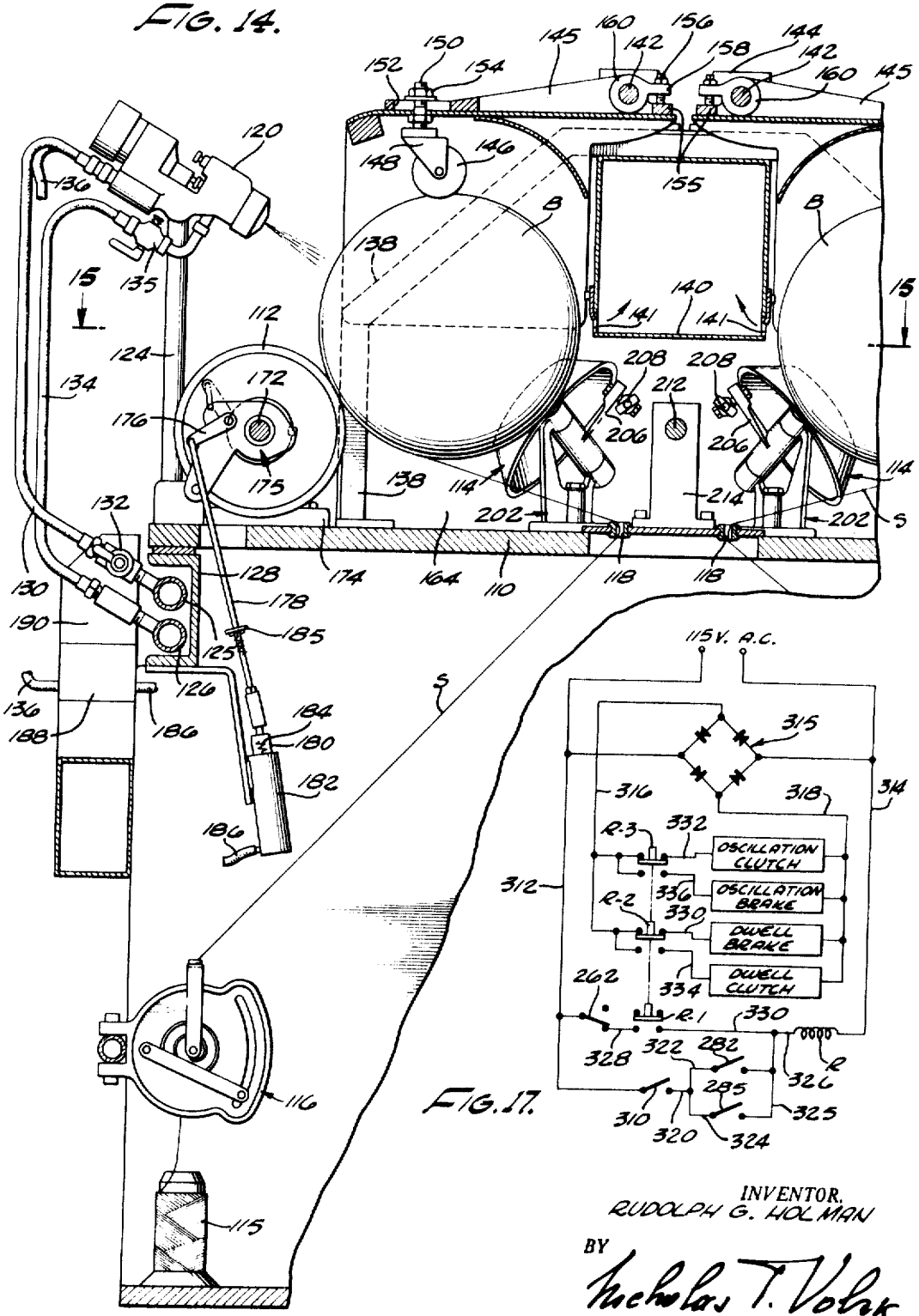
Figure 15:
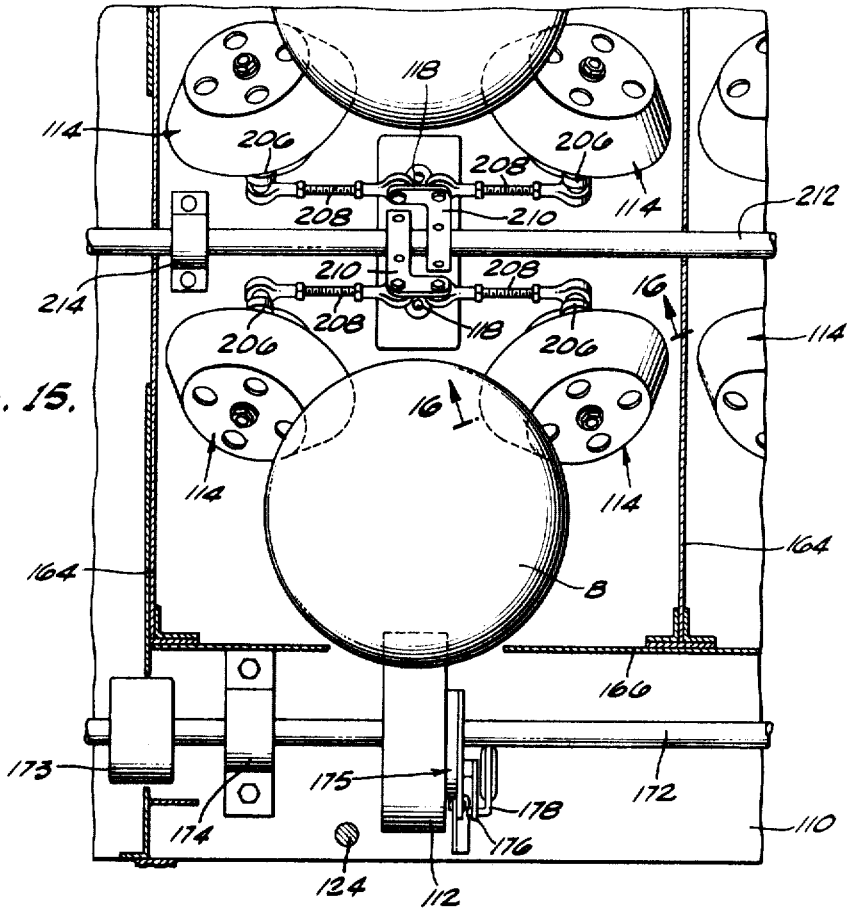
Figure 16:
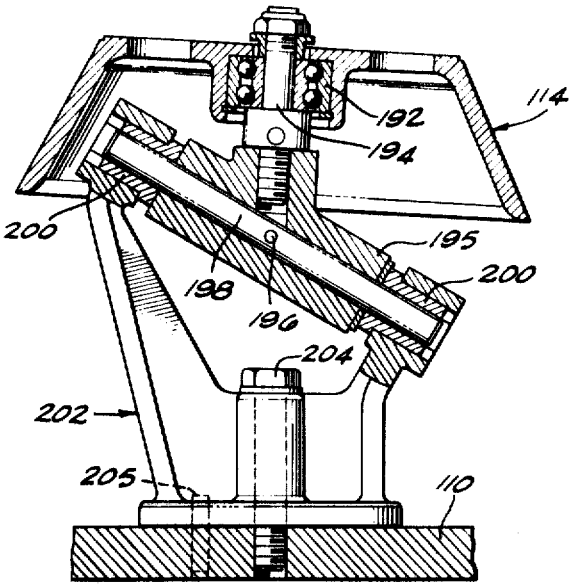
Figure 18:
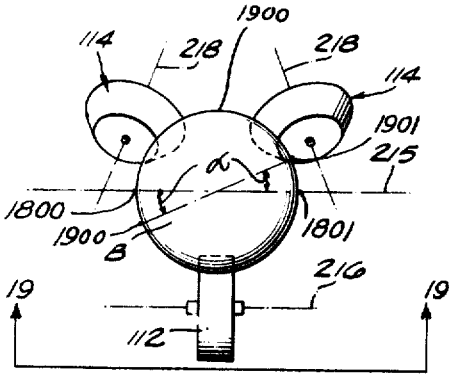
Figure 19:
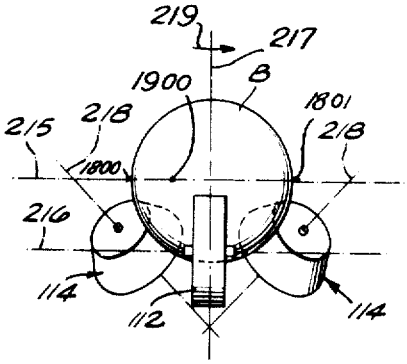
Figure 20:
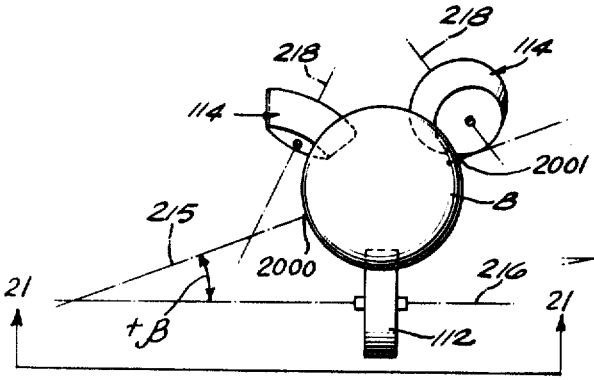
Figure 21:
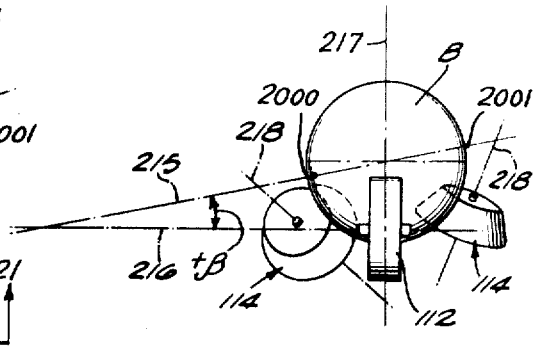
Figure 22:
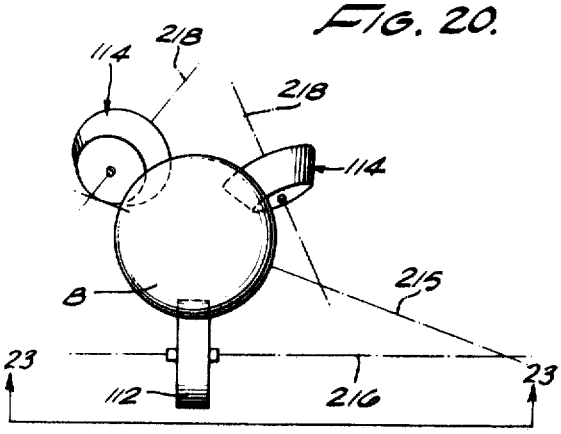
Figure 23:
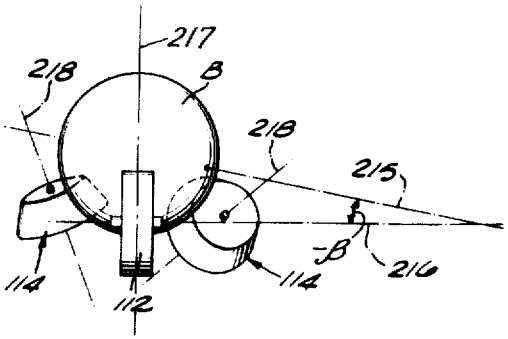

FIGS. 9a and 9b taken together are a plan view of a second form of apparatus having multiple winding stations;

FIG. 10 is a face view of a master dwell cam of the apparatus as seen along the line 10—10 of FIG. 9a;

FIG. 11 is a face view of a dwell-selector cam of the apparatus as seen along the line 11—11 of FIG. 9a;

FIG. 12 is a face view of a dwell-timing cam as seen along the line 12—12 of FIG. 9a;

FIG. 13 is a face view of a counting cam of the apparatus as seen along the line 13—13 of FIG. 9a;

FIG. 14 is a vertical sectional view of a portion of the apparatus along the line 14—14 of FIG. 9b, showing the winding mechanism at one of the winding stations;

FIG. 15 is a horizontal sectional view along the line 15—15 of FIG. 14;

FIG. 16 is a fragmentary section taken as indicated by the line 16—16 of FIG. 15;

FIG. 17 is a wiring diagram of the control system used in the apparatus shown in FIGS. 9a and 9b;

FIG. 18 is a simplified plan view of the winding mechanism at a winding station of the apparatus, the mechanism being shown at one stage of the winding operation;

FIG. 19 is an end elevation of the structure shown in FIG. 18;

FIG. 20 is a plan view similar to FIG. 18 at another stage in the winding cycle;

FIG. 21 is an end elevation of the structure shown in FIG. 20;

FIG. 22 is a plan view similar to FIGS. 18 and 20, showing the winding mechanism at still another stage in thhe winding cycle;

FIG. 23 in an end elevation of the structure shown in FIG. 22.

Figure 1:
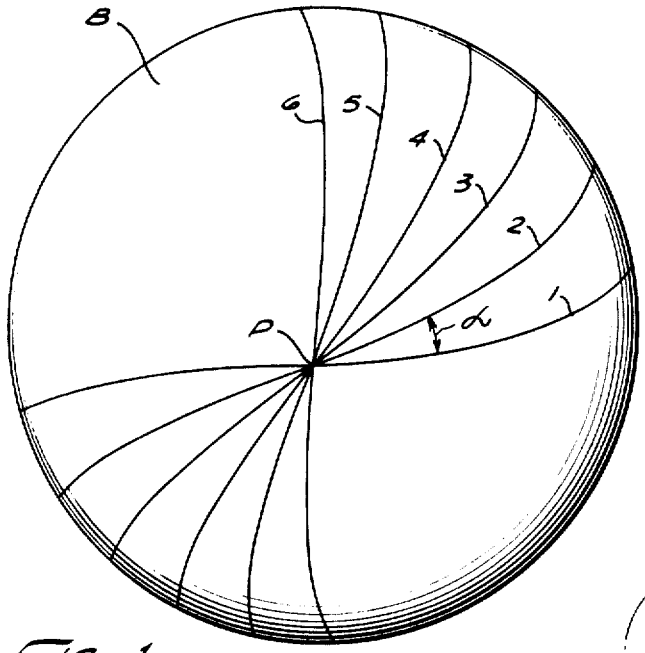
FIG. 1 is a simplified or diagrammatic view of a sphere showing a group of winding turns constituting a selected winding cycle of the invention, this winding cycle being epeated with successive displacements over the whole pherical area to produce a completely wound ball.
Figure 4:
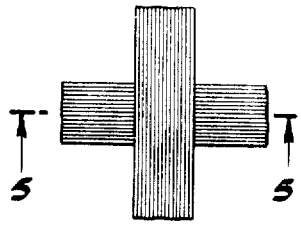
FIG. 4 is a fragmentary plan view on an enlarged scale of an intersection formed by an untwisted strand comprising a number of separate filaments.

FIG. 1, which represents a ball in the process of being wound, shows a typical group of turns produced during a single winding cycle, the group comprising six turns of thread wound around a ball B, the successive turns of the cycle being numbered 1 to 6. In this instance, all of the turns produced during the cycle intersect at two polar points P, there being two such polar points at diametrically opposite positions on the periphery of the ball. The successive turns of the group produced during the winding cycle, are displaced approximately 15° as measured by the angles at the polar points P. Thus, the total displacement for the cycle, and the group, is 90° and the completed cycle covers approximately two diametrically opposite quadrants of the spherical area of the ball.

Figure 2:
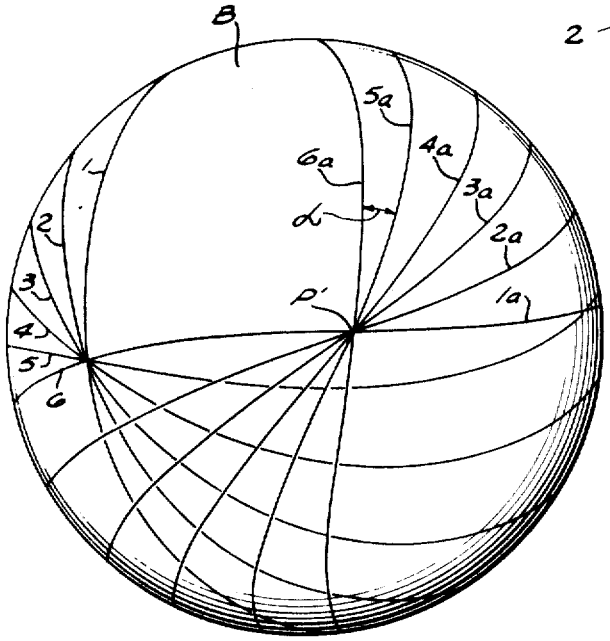
FIG. 2 is a similar view showing a second succeeding vinding cycle added to the first winding cycle to show he geometrical relationship between successive winding ycles.
Figure 5:
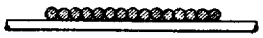
FIG. 5 is a sectional view of the intersection along the line 5—5 of FIG. 4.

FIG. 2 shows the next succeeding winding cycle comprising six identical turns, numbered 1a to 6a, intersecting at a pair of diametrically opposite pole points P'. It is to be noted that the last turn of the first winding cycle, numbered as turn 6 in FIG. 2, is continued along a small circle path 200, which may span an angle such as from 20° to 80°, and 100° to 170°, so that the two adjacent polar regions P and P' are spaced apart on this continuation turn. Thhe circular distance P—P', which is a sector, or an arc, is, of course, a fraction of a circle. In the same way, a third successive winding cycle, which is not shown in FIG. 2, would start with the continuation of the turn 6a and one of the poles of the third winding cycle would be on the turn 6a. It is apparent that the paths described by the successive pairs of poles will conform to some particular geometrical pattern, the selected pattern of pole migration being such as to achieve the desired uniform distribution of the wound material over the spherical area of the ball.

Figure 3:
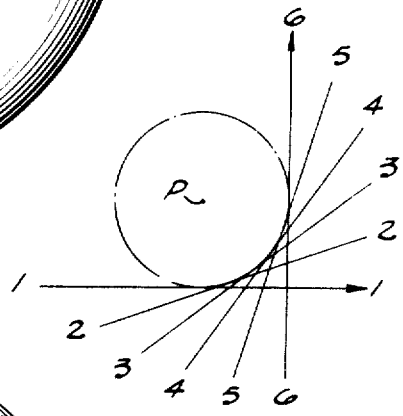
FIG. 3 is a similar fragmentary view showing how the ntersections of the individual turns of a winding cycle nay be dispersed over a polar region.

The previously mentioned four variables that may be controlled selectively for covering of a ball may now be explained. The first variable is angle $\alpha$, FIG. 1, which corresponds to the angular displacement of the successive turns of a cycle occur at two precise polar points, as intersection of the successive turns at the two polar regions of the winding cycle. Thhe second variable afforded by the invention is the concentration of the intersections at the two polar regions formed during each winding cycle. Maximum concentration is obtained when the successive turns of a cycle occur at two precise polar points, as shown in FIGS. 1 and 2. In practice, no such concentration of the intersections at a geometric point is accomplished. Actually, there is a dispersal of the successive intersection point over a polar region. In practice, the dispersed intersection points fall along a line that curves concentrically around an imaginary polar point. Thus, in FIG. 3, the intersections of the turns of a winding cycle lie on a circle indicated by a dotted line instead of being concentrated at a single polar point.

The third variable is the number of turns, and consequently the number of polar intersections, in a winding cycle. Finally, the fourth variable is the displacement of each pair of poles from the next preceding pair, which is produced by the machine during the so-called pause period. The meaning of "pause", in this case, is that the ball is rotated during the pause period around a stationary-in-space axis, and this axis is not oscillated in the course of the rotation of the ball. During the wind period, this axis is oscillated. Therefore, the term "pause" refers to the pause in the oscillation of the axis.

In the presently preferred practice of the invention, the angular displacement of the successive turns of a winding cycle is approximately 15°, as shown in FIGS. 1 and 2, and the successive turns of a winding cycle intersect at two polar regions. The preferred winding pattern is further characterized by six turns in each winding cycle, and each of the diametrical pair of poles is displaced from the preceding pair by about one-third of a circle, which may be a great circle, or approximately 120° in the circular direction of the last turn of the preceding cycle. Each cycle covers approximately two quadrants or approximately half the surface of the ball by means of six turns produced during the wind period.

The circular arc which is followed during the dwell, or the pause period, i.e., when rod 212 is at a standstill, may be anywhere from 20° to 80°, and 100° to 170°, the 120° arc being preferable to the shorter arc, such as 20° to 80°, because the disclosed system is timed by means of mechanical cams, relays, and switches, and it is simpler to adjust them for proper timing and consistent operation when the arc is longer. The preferred arc is 120° also because it produces a more uniform dispersion of the turns over the entire surface of the ball.

It can be readily appreciated from the foregoing discussion that other combinations of the four variables may be selected in various practices of the invention. In this regard, a feature of the invention is that random manipulation of the four variables by a person skilled in the art without special care or forethought is more likely than not to result in a superior winding pattern that affords full and uniform coverage of the ball with only moderate yardage of the winding material.

It is possible, of course, to pile up excessive intersections at local points by deliberately seeking to do so, and using an inordinately large number of turns for each winding cycle. If the polar intersections are dispersed in the general manner shown in FIG. 3, however, there is great latitude in the number of turns that can be used for each winding cycle. It is possible, too, to cause the poles to overlap with undesirable effects. In actual practice, however, there is a high probability that random manipulation of the fourth factor will result in substantially uniform distribution of the successive polar regions over the spherical area of the ball.

Figure 6:
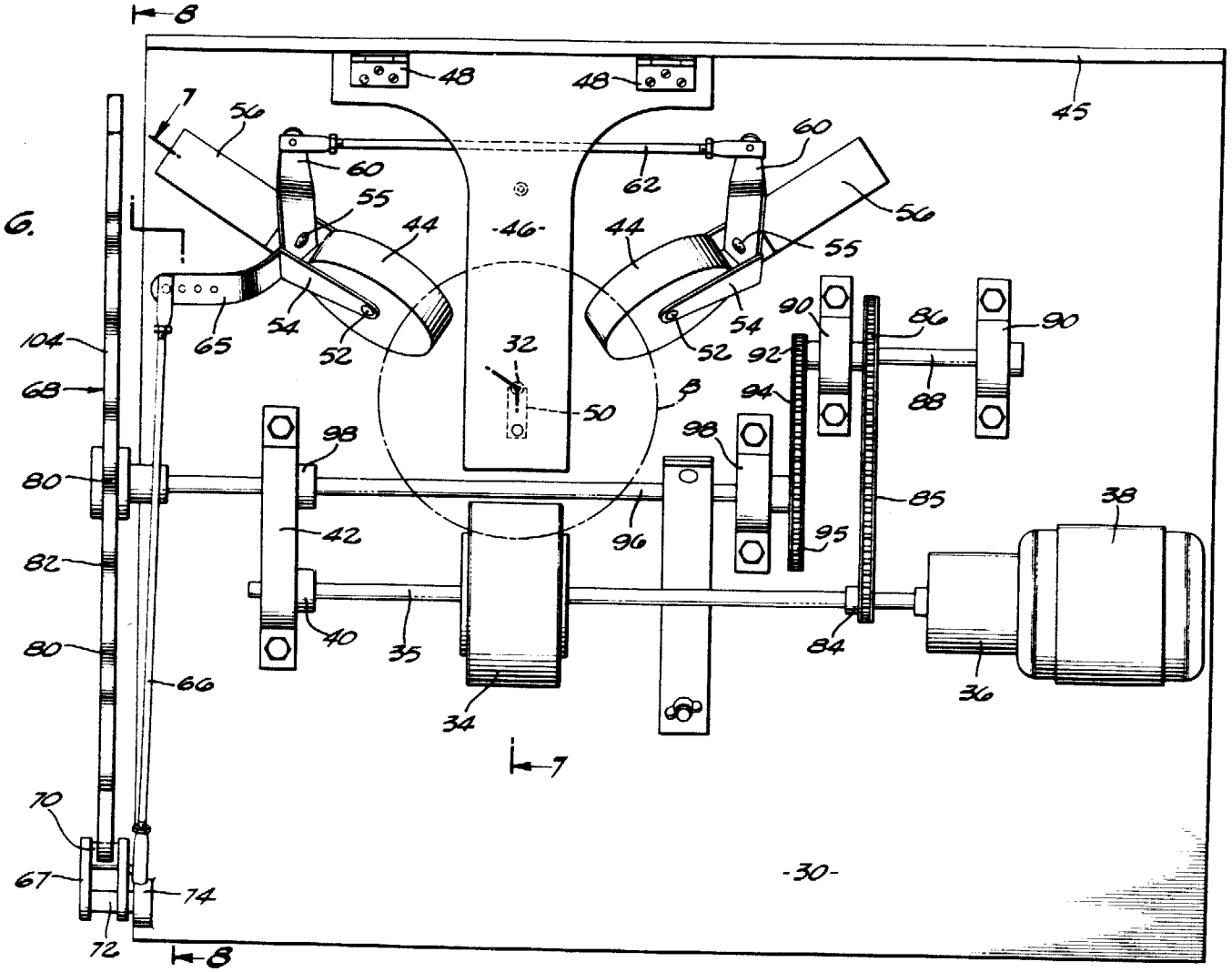
FIG. 6 is a plan view of one form of apparatus that may be used to carry out the invention.
Figure 7:
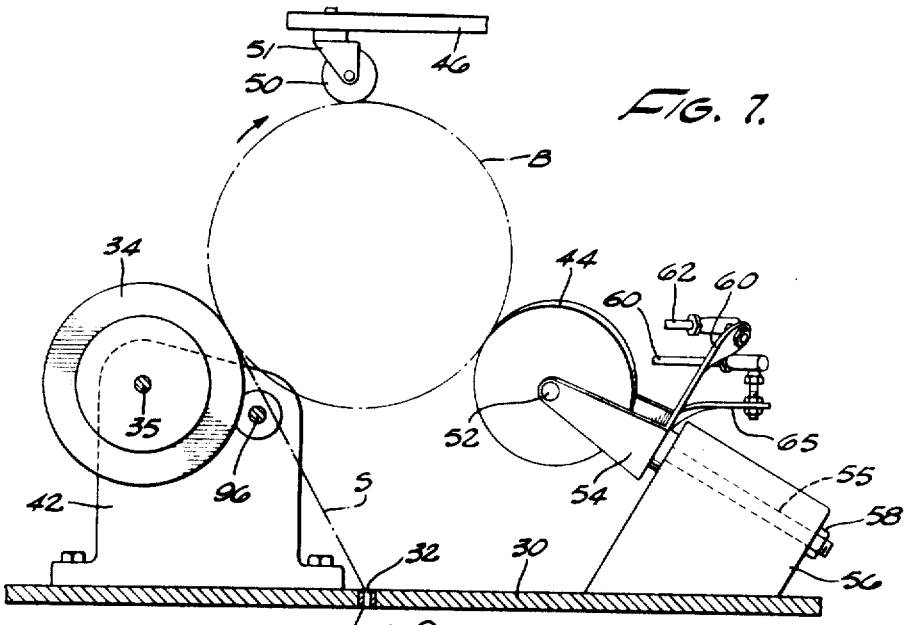
FIG. 7 is a sectional view taken as indicated by the angular line 7—7 of FIG. 6.
Figure 8:
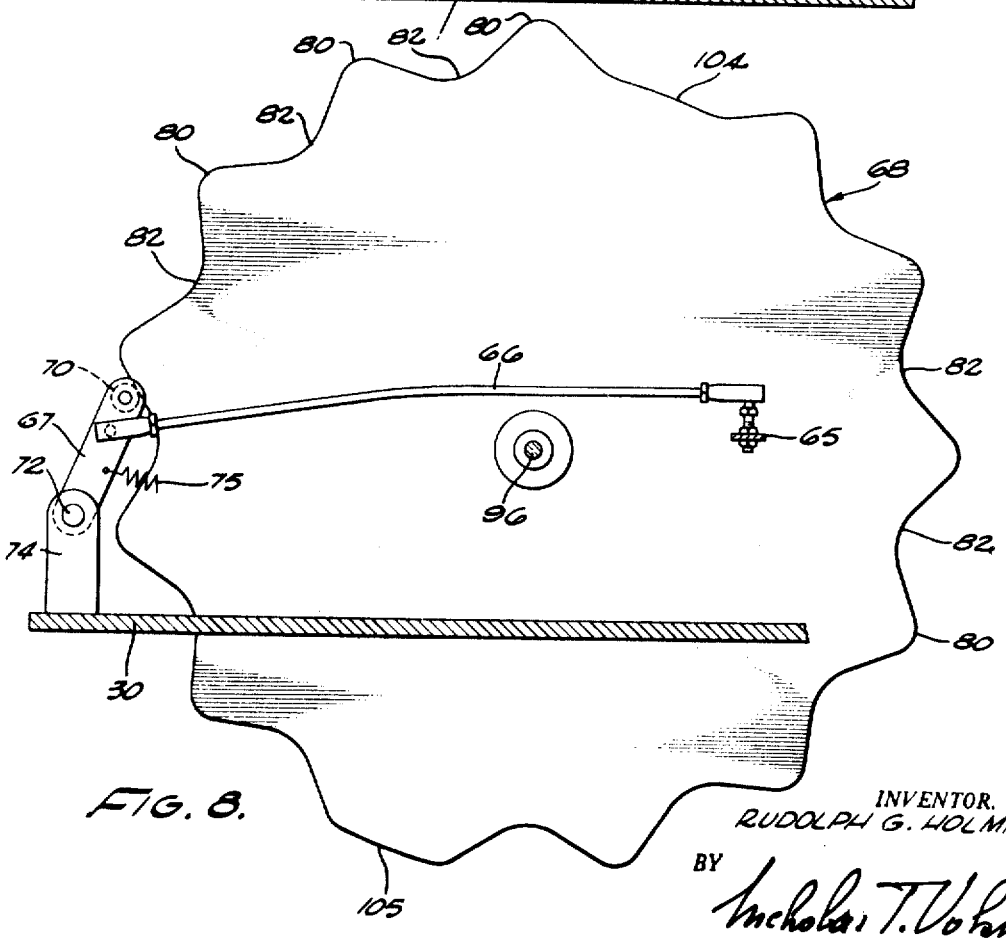
FIG. 8 is a sectional view taken as indicated by the line 8—8 of FIG. 6, showing the configuration of a control cam of the apparatus.

The first and simpler form of apparatus for carrying out the described method of winding a ball, is shown in FIGS. 6, 7 and 8. The apparatus includes an elevated base plate 30 with a small sleeved aperture 32 therein, through which a strand S may extend upward from a source below the base plate to wind onto a ball B.

A suitable drive roller 34 for rotating the ball B is positioned for peripheral tangential contact with the ball and for this purpose, is mounted on a drive shaft 35. The drive shaft 35 extends from a gear box 36 on a motor 38 and is supported at its outer end by a bearing 40 in an upright bearing support 42.

Two idler rollers 44 located on opposite sides of the plane or rotation of the drive roller 34, are positioned for peripheral tangential contact with the ball B at two spaced points on opposite sides of the plane of rotation of the drive roller 34. The two idler rollers 44 cooperate with the drive roller 34 to form a three-point seat for supporting the ball B. The two idler rollers 44 are positioned at least 120° from the drive roller 34 and are not more than 120° apart. Preferably the two idler rollers are less than 120° apart since lessening this spacing increases the pressure of the drive roller 34 on the ball when the ball is pressed into the three-point seat.

Any suitable arrangement may be used to releasably hold the ball B in the three-point seat provided by the drive roller 34 and the two idler rollers 44. In the present apparatus an upright plate 45 at the rear edge of the base plate 30 is provided and an upper forwardly extending arm 46 is mounted on the upright plate 45 by hinges 48 to weigh down the ball B. As best shown in FIG. 7, the arm 46 for pressing the ball down to the three-point seat is provided with a small roller or caster 50 in a swiveled bracket 51. The arm 46 may be swung upward out of the way whenever it is desired to replace a ball in the three-point seat.

Each of the two idler rollers 44 is mounted by an axle 52 in a bracket 54 having a pivot shank 55. The pivot shank 55 is rotatably mounted in a suitable bearing 56 and is retained therein by a nut 58. Each of the two brackets 54 for the two idler rollers has an operating arm 60 to cause oscillation of the idler roller about the axis of its pivot shank and these two operating arms are interconnected by a link 62. By virtue of this link, the two idler rollers 44 may be oscillated in a synchronous manner. One of the idler roller brackets 54 is provided with a second operating arm 65, which is connected by an operating rod 66 to a rocker arm 67 controlled by a relatively large cam wheel 68. The rocker arm 67, which comprises two parallel interconnected bars, carries a roller 70 at its upper end which functions as a follower in contact with the periphery of the cam wheel 68. The rocker arm 67 is mounted by a pivot 72 on an upright support 74 and is continuously pulled toward the periphery of the cam wheel by a suitable coiled spring 75.

It will be noted in FIG. 7 that the axis of oscillation of an idler roller 44, i.e., the axis of the shank 55 of the idler roller bracket, is on a diameter of the idler roller and passes through the point at which the periphery of the idler roller makes tangential contact with the ball B. Preferably, this axis intersects the center, C, of the ball B and is inclined downward from the ball center C. The angle of downward inclination relative to the horizontal may be in the order of 45°, the angle being somewhat less than 45° in this particular embodiment of the invention. Note also in FIG. 7, that the axis of the drive roller 34 is positioned 45° downward from the center of the ball B. None of these angles is critical, however.

The cam wheel 68 has a periphery with an undulating configuration forming alternate peaks 80 and valleys 82. As the follower 70 on the rocker arm 67 traverses the periphery of the cam wheel 68 from one peak to the next succeeding peak, or from one valley to the next succeeding valley, the two idler rollers 44 make one complete oscillation about the corresponding pivot shanks 55, each idler roller swinging from one limit position to the opposite limit position and back to the first limit position. As heretofore stated, the time interval of one such complete oscillation of the two idler rollers 44 approximates the time interval of one complete rotation of the ball B by the drive roller 34.

Any suitable arrangement may be used to actuate the cam wheel 68 in the desired time relation to the ball B. In the present embodiment of the apparatus, the cam wheel 68 is operatively connected to the drive shaft 35 that carries the drive roller 34. For this purpose, a sprocket 84 on the drive shaft 35 is connected by a sprocket chain 85 with a sprocket 86 on a counter shaft 88. The counter shaft 88, which is mounted on a pair of bearings 90, carries a sprocket 92. The sprocket 92 is connected by a sprocket chain 94 with a sprocket 95 on a shaft 96. The shaft 96 is journaled in a pair of bearings 98 and carries the cam wheel 68.

The particular cam wheel 68 shown in FIG. 8 is designed to create successive substantially identical winding cycles of approximately 6½ turns each. For this purpose, the came wheel has two sets, or series, of 6 peaks 80, and these two series of 6 peaks are separated by a lower dwell or expanded valley 104 and by an upper dwell or expanded peak 105, these two dwells being substantially 180° apart. In this instance, each of the two dwells has a circumferential length that is approximately ⅓ of the circumferential distance from one peak 80 to the next succeeding peak. Since the peak-to-peak distance represents substantially one rotation of the ball, each of the two dwells corresponds to approximately ⅓ of a rotation of the ball.

The manner in which the described apparatus carries out the process of winding the ball may be readily understood. The oscillation of the two idler rollers 44 about their points of contact with the ball B is substantially frictionless with no dragging effect on the ball. The inclination of the drive rollers in opposite directions in the course of a single rotation of the ball, causes the currently applied winding on the ball to be biased first in one direction for approximately 180° of rotation of the ball, and then to be biased in the opposite direction for the remainder of the rotation. As a result, the successive turns around the ball intersect in two diametrically opposite polar regions with an angular displacement of approximately 15° between the successive turns. In this manner, the strand S is wound on the ball B in winding cycles of 6½ turns each. At the end of each of these winding cycles there is a pause in the oscillation which causes the winding to continue just off great circles for approximately ⅓ of the circumference of the ball to start a new winding cycle.

The heretofore mentioned first variable in the winding cycle comprising the angular displacement of the successive turns of a winding cycle as measured at the two poles, is determined by the amplitude of the oscillations of the two idler rollers 44, i.e., by the radial differential between the peaks 80 and the valleys 82 of the cam wheel 68. This radial differential may be varied at will.

The second variable or the concentration of the intersections of the windings at the two polar regions of a winding cycle depends upon the time ratio between the oscillations of the idler rollers 44 and the rotations of the ball B. With the rollers oscillating in exact phase with the rotation of the ball B, the intersections are concentrated at two precise polar regions. Although theoretically, the intersection of the threads at the poles should be of the type illustrated in FIG. 1, i.e., at a geometric point "P," in actual practice such point concentration is never obtained because there is always a slight variable slippage between the ball and the drive roller 34, with the result that instead of a single point, the six turns form a small area over which the intersections are dispersed. Such imperfect functioning of the machine in this case, happens to be desirable because intersection of all the turns produced during the single cycle at a point would produce high spots in the winding, which are undesirable. Accordingly, such dispersal of the turns over a region produces a smoother winding. If desired, the drive sprocket 84 may be either enlarged or reduced to make the peak-to-peak rotation of the cam wheel slightly out of phase with the rotation of the ball to result in a still further polar dispersal of the intersections in the two polar regions of each winding cycle.

The third variable, which is the number of turns in a winding cycle, may be increased or reduced by increasing or reducing the number of peaks and valleys on the cam wheel in each of the two series of peaks and valleys. In this regard, it is to be noted that the two series of peaks and valleys on the cam wheel 68 need not be equal. Thus, instead of two operating cycles of approximately 6½ turns each, the cam wheel 68 could be shaped to cause one operating cycle of 8½ turns followed by an operating cycle of 4½ turns. In such an arrangement, the alternate winding cycles would be identical.

The fourth variable, which is the displacement of each diametrical pair of poles from the next preceding pair, depends upon the circumferential extent of the two dwells 104 and 105. Obviously, it is simple matter to vary the circumferential dimensions of these dwells, and, of course, the two dwells need not both be of the same circumferential dimension.

The second form of the apparatus, shown in FIGS. 9a to 17, provides a plurality of winding stations positioned back-to-back in two parallel rows, the two rows of stations being mounted on two elevated co-planar platforms or base plates 110. Each of the winding stations has a drive roller 112 and two beveled idler rollers 114 which cooperate to provide a three-point seat for supporting a ball B.

At each of the winding stations, a strand S is supplied by a spool 115 and controlled by a well-known type of automatic tensioning device 116. The strand S is led upward through a sleeved aperture 118 to the periphery of the ball as shown in FIG. 14.

At each winding station, an atomizer or spray head 120 is adjustably mounted by a jaw-type holder 122 on an upright support rod 124. The various spray heads are supplied by a compressed air supply pipe 125 and a liquid supply pipe 126 which are housed in a longitudinal channel 128 along each row of stations. Air from the supply pipe 125 is supplied to each of the spray heads 120 through a flexible hose 130 controlled by a valve 132 and liquid from the supply pipe 126 is fed to the spray head through a hose 134 having a valve 135. A third hose 136 is connected to each spray head for remote control of the operation of the gun by air pressure. In the presently preferred practice of the invention, the liquid supplied by the pipe 126 is a liquids can be used in various practices of the invention.

The two rows of windings stations are provided with a frame structure 138 which carries a central exhaust duct 140 for removing vapors released by the various spray heads. This duct has intake ports 141 at the various winding stations. Mounted on top of the frame structure 138 is a pair of shafts 142 journaled in spaced bearings 144. Rotatably mounted on these shafts 142 are a plurality of overhanging arms 145, there being one arm at each winding station to weight down a ball B. Each of these overhead arms 145 carries a small pressure roller or caster 146 in a swivel bracket 148. The swivel bracket 148 has a shank 150 that extends through a longitudinal slot 152 in the overhead arm and is adjustably retained therein by a pair of nuts 154.

Each of the overhanging arms 145 is independently rotatable on the corresponding shaft 142 and may be individually swung up and back manually to permit replacement of a ball at the winding station. If desired, however, all of the overhanging arms 145 on either of the two shafts 142 may be raised simultaneously by rotation of the shaft. For this purpose, each of the overhanging arms 145 has a rearwardly extending flange 155 which normally rests against an adjustable screw 156 carried by a finger 158. The finger 158 is unitary with a sleeve 160 that is fixedly mounted on the corresponding shaft 142 by a set screw 162. It is apparent that rotation of a shaft 142 in a direction to depress the fingers 158 thereon, will cause all of the overhanging arms 145 on the shaft to be rotated upward.

Each of the winding stations is largely enclosed by a suitable hood structure to cause the vapors released by the spraying operation to be confined and drawn off by the exhaust duct 140. The hood structure for each winding station includes two side walls 164 (FIG. 15) and an upper wall structure 166 carried by the corresponding overhanging arm 145.

All of the drive rollers 112 of one of the two rows of winding stations are rotatably mounted on a common drive shaft 170, and all of the drive rollers of the other row of winding stations are mounted on a second similar drive shaft 172. These two shafts, which may be made in several sections connected by couplings 173, are journaled in spaced bearings 174. Preferably, each of the drive shafts 170 and 172 is provided with a curved guard 177, which guard has gaps 179 to clear each of the drive rollers 112.

Each of the drive rollers 112 is operatively engageable with the corresponding drive shaft by means of an individual clutch 175 that is controlled by a rocker arm 176. The rocker arm 176 of each clutch 175 is connected by a link 178 with a piston 180 of an air cylinder 182 for remote control of the clutch by compressed air. A suitable coiled spring 184 connected at one end to a clip 185 on the link 178, and connected at the other end to the air cylinder 182, normally holds the clutch in engagement to drive the roller 112. When compressed air is admitted to the air cylinder through a control hose 186, the clutch is disengaged in opposition to the tension of the coiled spring.

The delivery of compressed air to the control hose 186 is governed by a valve 188 that is adapted for electrical actuation by a corresponding counter 190, there being a counter at each of the winding stations. The counter 190 is energized by electrical pulses generated at a central control station, as will be explained, and may be set to predetermine the yardage of the strand S that is wound on each of the balls B. The counter progresses to its zero position from whatever yardage value at which it may be set and then actuates the valve 188. Actuation of the valve 188 not only delivers compressed air to the control hose 186 to disengage the clutch 175 for stopping the winding operation at the winding station, but also delivers compressed air to the previously mentioned control hose 136 to stop operation of the corresponding spray head 120.

As best shown in FIG. 16 each of the beveled idler rollers 114 is mounted by a ball bearing 192 on a spindle 194 that is carried by an inclined sleeve 195. Inclined sleeve is fixedly held by a screw 196 on an inclined pivot pin 198 and the opposite ends of the pivot pin are journaled in suitable bearing bushings 200 in a bracket 202. Each of the brackets 202 is mounted by a central screw 204 on the corresponding platform 110 and is secured against rotation on the platform by a suitable key or dowel 205.

The sleeve 195 that carries the spindle 194 has a control arm 206 for oscillation of the idler roller 114 about the axis of inclined pivot pin 198. As best shown in FIG. 15, the two control arms 206 of the two idler rollers 114 at each winding station are connected by a pair of corresponding links 208 to an angular bracket 210. All of the angular brackets 210 of the two rows of winding stations, are fixedly mounted on a longitudinally reciprocative shaft 212 that is slidingly mounted in suitable bearings 214. It is apparent that the shaft 212 may be reciprocated longitudinally to cause simultaneous oscillation of all of the idler rollers 114 of two rows of winding stations.

As may be seen in FIG. 15, the two beveled idler rollers 114 at each winding station, are relatively close together with their beveled surfaces tangential to the ball B. As may be seen in FIG. 14, the axis of the drive roller 112 at each winding station is positioned in a direction approximately 45 degrees downward from the center of the ball B. The axis of oscillation of each of the idler rollers 114, i.e., the axis of the inclined pivot pin 198, passes through the point of tangential contact of the beveled idler roller with the periphery of the ball B and intersects the center of the ball at an angle of 45° downward from the horizontal.

The oscillating action of the two beveled idler rollers 114 and their effect on the rotation of the ball B, may be understood by reference to FIGS. 18–23. FIGS. 18 and 19 show both of the idler rollers 114 at their mid-points of oscillation and horizontal axis 215 passing through points 1800 and 1801 on the surface of the ball at this moment. Axis 215 will pass through points 1900 and 1901 upon completion of one complete revolution of the ball by roller 112 and the ball will be rotated through an angle $\alpha$ around a vertical axis 217 illustrated in FIG. 19, passing through the center of the ball, and being rotated in the direction of an arrow 219, this angle corresponding to angle $\alpha$ illustrated in FIG. 1. FIGS. 20 and 21 show the two idler rollers at one extreme of their range of oscillation; and FIGS. 22 and 23 show the two idler rollers at the other extreme of their range of oscillation. In FIGS. 20 and 21, axis 215 is passing through points 2000 and 2001 on the surface of the ball and the two axes 216 and 215 subtend an angle $+\beta$. In FIGS. 22 and 23, the two axes 215 and 216 subtend an angle $-\beta$ and axis 215 passes through points 2000 and 2001 on the surface of the ball. The axis of rotation of the ball B is indicated by the broken line 215. FIGS. 18, 20 and 22 are the plan, or top, views, while FIGS. 19, 21 and 23 are the side views in the direction of arrows 19—19, 21—21 and 23—23. In FIGS. 18 and 19, the axis 215 is parallel with the axis of rotation 216 of the drive roller 112. The axis 215 of the ball oscillates a single plane passing through the axis 216 and through the center of the ball, and, except for the momentary transition position of the axis shown in FIG. 18, the axis 215 intersects the axis 216 as shown in FIGS. 20–23.

The two axes of rotation 218 of the two idler rollers 114, oscillate in the plane passing through the axis of rotation 215 of the ball B and constantly intersect the axis 215. While this arrangement of two beveled idler rollers differs somewhat from the arrangement of idler rollers in the first described apparatus, the winding operation is performed in the same manner and is characterized by the same winding cycles as heretofore described.

Before proceeding with a more detailed description of the control system, it would be helpful to describe the function which it performs.

The system is arranged so that there is a constant dwell, or pause, period and a constant wind period, the dwell period being followed by the wind period. The two periods are timed by means of cams and switches and a single relay, which has a plurality of contacts. During the dwell period, there is no oscillation of the ball by means of rollers 114, and, therefore, ball B revolves around axis 215, which is stationary, i.e., it is not oscillated, during the dwell period. Ball B never stops rotating around axis 215, but during the pause period, because axis 215 is not oscillated during the pause period, ball B rotates only around axis 215 and there is no simultaneous rotation of the ball around the vertical axis 217 passing through the stationary center of ball B.

The machine and its control system are so arranged that one dwell period takes place when the relative position of the bevelled rollers 114 is that illustrated in FIGS. 20 and 21, which arbitrarily may be called the extreme left position. Accordingly, since axis 215 of the ball at this time forms an angle $+\beta$ with axis 216 of the drive roller 112, thread S follows a path of a small circle during the dwell, or pause, period. During the next dwell period, the position of the rollers 114 corresponds to that illustrated in FIGS. 22 and 23, which is the extreme right position of the rollers, at which time axis 215 again makes an angle $-\beta$ with axis 216, but on the opposite side of roller 112.

It is to be noted here that axis 215 illustrated in FIGS. 18–23, is an axis around which ball B revolves at any given instant. It is to be understood, however, that the ball B itself does not remain stationary with respect to this axis, but it revolves constantly because of the continuous rotation of the ball by roller 112, and, therefore, the ball and its outer surface, constantly shifts with respect to axis 215, with the result that points 1800 and 1801, FIG. 18, 2000 and 2001· FIG. 20 and 2200 and 2201, FIG. 22, are not identical points on the surface of the ball. Quite the contrary, they are entirely different points because of the continuous displacement of the ball's surface with respect to axis 215 and because of the modifying influence exerted by the rollers 114 on the direction of rotation of ball B.

It may be noted here that at the end of each complete revolution of the ball, ball B is rotated either in a clockwise or counter-clockwise direction around the vertical axis 217, passing through the stationary center of the ball as illustrated by an arrow 219, with the result that points 1800 and 1801 in FIG. 18 travels as angle $\theta$, equal to angle $\alpha$, around, or along, equator 1900 FIGS. 19 and 18.

In order to obtain a control system which gives fixed-in-duration wind periods, during which period the machine winds 6½ turns, and two fived dwell, or pause, periods, at which time the machine winds a small circle for substantially 120 degrees, thus shifting along a 120° arc the position of each succeeding pair of poles from the preceding pair of poles, it becomes necessary to have timing means for the two wind periods and timing means for the two pause periods. Additionally, if it is desired to terminate one wind period when rollers 114 are in the extreme left position, or the position illustrated in FIGS. 20 and 21, and then terminate the next succeeding wind period when the rollers 114 are in the extreme right position, such as that illustrated in FIGS. 22 and 23, then it becomes necessary to have a cam which controls the duration of the wind period, and at the very same time, by the same token, controls the beginning of the dwell, or pause, period. In the system that will be described later in connection with the description of FIGS. 9a, 10–13 and 17, this cam will be called a master dwell cam, which is cam 305 in FIGS. 9a and 10, having a single switch actuating contact 306 for the actuation of the normally open switch 310, closing of which terminates the wind period and begins the pause period. The speed of rotation of cam 305 is so arranged that 6½ turns of ball B and one revolution of cam 305 are obtained during one complete wind period. Therefore, the master dwell cam 304 controls the duration of the wind period. This cam and shafts 300 and 274, reciprocating rod 212, its crank arm 290 and crank 288, are at a standstill during the wind period. To obtain this, an oscillation clutch is inserted between shaft 268 and shaft 274. Counter-shaft 270 is driven by shaft 228 which continuously rotates shafts 170 and 172. These two shafts continuously rotate the balls through drive rollers 112, FIGS. 9b, 14 and 18–23.

The system is also provided with a cam which terminates the dwell, or pause, period and begins the wind period. This is the dwell timing cam 256, in FIGS. 9a and 12, which may have either one or two contacts depending upon the revolutions per minute of this cam as compared with the revolutions per minute of the ball. Cam 256 must terminate the dwell, or the pause, period after the ball has been rotated 120°.

In FIG. 9a, cam 256 has two contacts 258 which open the normally closed switch 262, thus terminating the dwell period, which means that cam 256 makes one-half revolution during one-third of a revolution (120°) of the ball. More precisely, the time period required to make one-half revolution of cam 256 plus the time required for operation of clutch 236 and brake 263, is equal to one-third revolution of ball B during the pause period.

An additional cam must be provided in order to obtain the termination of the wind period at one instance, when the oscillating rollers 114 are in the extreme left position, such as that illustrated in FIGS. 20 and 21, and then, during the succeeding wind period, termination of the suceeding wind period when rollers 114 are in the extreme right position, such as that illustrated in FIGS. 22 and 23. This is obtained by means of the dwell selector cam 276, which is made to rotate at the same revolutions per minute as the ball. One switch-actuating contact 278 is then provided on cam 276 and this single switch-actuating contact 278 then closes either switch 285 or switch 282, which are spaced 180° from each other around the periphery of cam 276. These switches 282 and 285, as illustrated in FIG. 17, are connected in series with switch 310, and, therefore, the actuation of relay R in FIG. 17 takes place only when switch 310 and either switch 282 or switch 285 are closed. The actuation of relay R, at the same time, terminates the wind period and begins the dwell, or pause, period. Therefore, the beginning of one dwell period always lags the beginning of the next dwell period by 180°, because of the 180° displacement of the switches with respect to cam 276.

In light of the above preliminary description of the control system it follows that it provides means for controlling the duration of the wind period, which is controlled by the master dwell cam 305, the dwell selector cam 276 which work as a combination to begin and end each wind period at the desired moment, the desired moment being when rollers 114 are in the extreme left position at the end of one wind period, and then in the extreme right position at the end of the next pause period. This variation produces a corresponding variation in the pattern, but it does not provide any variation in the durations of the wind and pause periods, these two periods remaining fixed as long as the main shaft 228, connected to the drive motor, not shown in FIG. 9a, revolves at constant speed. It should be noted here that variation in the revolutions per minute of the main drive motor does not affect the pattern on the ball, even though it will affect the actual time required to complete the wind and the pause periods, because increasing or decreasing of the revolutions per minute of sprocket 222 mounted on the drive motor shaft and of all the counter-shafts driven by sprocket 222, merely speeds up or slows down the operation of the machine without affecting the over-all pattern followed by the cord.

The control system illustrated in FIG. 9a, is also protected with an additional signal generator which is connected to switch 252. This switch is operated by the counting cam 246 connected by means of a sprocket chain 240 to shaft 228 through a gear box 234. The counting cam 246 makes one complete revolution for a predetermined length of the cord wound on the ball. For instance, in one example, switch 252 generates a single pulse at the end of 10 yards of cord wound on the ball. In this manner, the electrical pulses produced by the closing of switch 252 by cam 246 are used for operating counter 190, after receiving a predetermined number of pulses, operates solenoid 182, FIG. 14. This solenoid disconnects drive roller 112 from shaft 172 by means of clutch 175, thus stopping the rotation of ball B after a predetermined number of yards of cord have been wound on the ball. In this manner, the rotation of the ball is ordinarily stopped upon the completion of the entire winding.

Reverting now to a more detailed discussion of FIGS. 9a, 10–13 and 17, any suitable means may be provided to actuate the two drive shafts 170 and 172 in unison and to reciprocate the shaft 212 in the desired time relation to roation tof the two drive shafts. In this particular embodiment of the invention, the actuation of the two drive shafts and the reciprocative shaft is accomplished at a control station on a control platform 220 shown in 9a, this platform being elevated to approximately the level of the platform 110 of the two rows of winding stations.

A single drive motor (not shown) below the platform 220 actuates the entire machine, including the control system. Its shaft has a drive sprocket 222 and a sprocket chain 224 extends upward therefrom through a slot 225 in the platform to a sprocket 226 on a counter-shaft 228. The counter-shaft 228 is journaled in a pair of bearings 230 and is connected by couplings 232 with two gear boxes 234 and 235. The gear box 234 drives the previously mentioned drive shaft 170 and the gear box 235 drives the second drive shaft 172. The shafts 170, 172 and 228 rotate all the time as long as the machine is in operation. Accordingly, all the drive rollers 112 are driven by the above-mentioned single motor at a substantially constant speed. The motor need not be a synchronous motor because the entire system is driven by the single motor.

The drive shaft 170 extends through the gear box 234 into an electrically controlled dwell clutch 236 and carries a sprocket 238. It is the dwell clutch 236 which, when it is de-energized, terminates the pause, or the dwell, period. The sprocket 238 is connected by a sprocket chain 240 with a sprocket 242 that is operatively connected to gearing in a gear box 244. A shaft 245 extending from the gear box 244, carries a counting cam 246 (FIGS. 9a and 13). A stud 248 on the face of the counting cam actuates the operating arm 250 of a suitable normally closed switch 252 and thereby creates the required footage pulses for controlling the previously mentioned counters 190 at the various winding stations.

The dwell clutch 236 releasably connects the drive shaft 170 with a stub shaft 254 that is journaled in a pair of spaced bearings 255 and carries what may be termed a dwell-timing cam 256 (FIGS. 9a and 12). This cam has two diametrically opposite lugs 258 on its face for actuating the operating arm 260 of a normally closed, dwell-timing cam switch 262. The stub shaft 254 is provided with an electrically controlled brake 263. As mentioned previously, opening of switch 262 terminates the pause period and simultaneously starts the wind period.

The second drive shaft 172 extends through the gear box 235 and carries a sprocket 264 that is connected by a sprocket chain 265 with a second sprocket 266. The second sprocket 266 is on a counter-shaft 268 that is journaled in a bearing 270 and extends into an electrically controlled oscillation, or reciprocation, clutch 272. Clutch 272, when energized, oscillates, or reciprocates, rod 212 which, in turn, oscillates rollers 114. Therefore, clutch 272 controls the duration of the wind period. The oscillation clutch 272 releasably connects the counter-shaft 268 with a short shaft 274 that extends through a gear box 275. The short shaft 274 carries what may be termed a dwell-selector cam 276 (FIGS. 9a and 11) having a single lug 278 for actuation of the operating arm 280 of a left dwell switch 282 and alternately for actuation of the operating arm 284 of a right dwell switch 285. Both of these switches are normally open. As stated previously, cam 276 terminates one wind period when rollers 114 are in the extreme right position, and then at the end of the next wind period when rollers 114 are in the extreme left position. A stub shaft 286 extending from the gear box 275 carries a crank 288 having a crankpin 289 and this crankpin actuates a connecting rod 290 that is connected by a pivot pin 292 to the end of the previously mentioned reciprocative shaft 212.

The short shaft 274 extends from the gear box 275 into an electrically controlled oscillation brake 294 and also carries a sprocket 295. The sprocket 295 is connected by a sprocket chain 296 with a sprocket 298 on a stub shaft 300 that extends into a gear box 302. A stub shaft 304 carried by the gear box 302 mounts what may be termed a master dwell cam 305 (FIGS. 9a and 10). This cam carries a single lug 306 to actuate the operating arm 308 of a normally open master dwell cam switch 310, which controls the duration of the wind period by terminating it by a momentary closing of switch 310.

The manner in which control system shown in FIG. 9a operates may be understood by reference to the wiring diagram in FIG. 17. Alternating current is supplied by a pair of leads 312 and 314 and is rectified by a full wave rectifier 315 to supply direct current to a pair of leads 316 and 318, the direct current being employed to energize the two sets of clutches and brakes which are used to control the wind and the pause periods. A relay coil R controls a set of three relay contactors R–1, R–2 and R–3. There is one circuit for energizing the relay coil R and a second circuit for de-energizing the coil. As long as relay R is energized, the machine has a dwell, or pause, period, and when relay R is de-energized the machine has a wind period.

In FIG. 17, all elements, and especially the switches and the relay R contactors, R–1, R–2 and R–3, are illustrated in their normal position when relay R is de-energized. With all the contactors R–1, R–2 and R–3 in their upper positions (relay R is de-energized because switches 310, 282 and 285 are open and contactor R–1 is in its upper position, thus keeping circuit 330 to relay R also open), the circuits to the oscillation clutch 272 and the dwell brake 263 are closed and thus energized. Therefore, the entire control system, as shown in FIG. 17, is in the wind position.

As will be described more in detail below, relay R is momentarily energized during the pause period through the closing of switch 310 and then either switch 282 or 285 by their respective cams; relay R is then locked in its energized position through circuit 330, including contactor R–1 and the normally closed switch 262. Switch 262 remains closed for the desired duration of the pause, or dwell, period, and switch 262 is then opened by its dwell timing cam 256, which de-energizes relay R and thus again starts the wind period and terminates the dwell period.

The circuit for energizing the relay coil R comprises the master dwell cam switch 310 and the left and right dwell switches 282 and 285 in parallel therewith. The master dwell cam switch 310 is connected to the A.C. lead 312 and is connected to the left and right dwell switches 282 and 285 by a wire 320 and branch wires 322 and 324. The second sides of the left and right dwell switches 282 and 285 are connected to a wire 325 which, in turn, is connected to the relay coil R by a wire 326. The second side of the relay coil R is connected to the second A.C. lead 314. Therefore, energization of relay R is controlled jointly by switch 310 and one of the switches 282 or 285, switch 310 being connected in series with these dwell selector switches.

The alternate circuit for energizing the relay coil R includes the dwell-timing cam switch 262 and the contactor R–1, this contactor closing the circuit to lock relay R is long as the dwell-timing cam switch 262 is closed. Switch 262 is normally closed, and therefore, relay R becomes locked immediately after the completion of its energization circuit 310—285 or 310—282 and closing of the lower contacts by armature R–1 of relay R upon its energization. The dwell-timing cam switch 262 is directly connected to the A.C. lead 312 and is connected by a wire 328 with one of the two contacts associated with the contactor R–1, the other of the two contacts being conneced to the previously mentioned wire 326 by a wire 330.

When a predetermined number of revolutions of the two drive shafts 170 and 172 for actuating the driving rollers 112 at the multiple winding stations are completed to carry out a selected winding cycle on the balls B at the winding stations, lug 306 on the master dwell cam 305 closes the normally open switch 310 momentarily, and, before this switch opens, lug 278 on the dwell-selector cam 276 closes either the left dwell switch 282 or the right dwell switch 285, thereby energizing the relay coil R. Energization of the relay coil R actuates the relay contactor R′–1 to lock the relay, the normally closed dwell timing caming switch 262 being closed at this time. After a predetermined degree of rotation of the two driving shafts 170 and 172, one of the lugs 258 of the dwell-timing cam 256 momentarily opens the normally closed dwell-timing cam switch 262 to de-energize the relay coil R, which terminates the pulse period an dstarts the wind period.

As long as the relay coil R is de-energized, the contactors R–2 and R–3 energize the dwell brake 263 and the oscillation clutch 272 respectively, and therefore, these elements are energized during the wind period but they become de-energized upon the completion of the wind period. The circuit through the dwell brake 263 includes one of ,the two contacts associated with the contactor R–2, which contact is directly connected to the D.C. lead 316, the other of the two contacts being connected to one side of the dwell brake 263 by a wire 330. The second side of the dwell brake 263 is connected directly to the second D.C. lead 318.

The circuit through the oscillation clutch 272, which is energized during the wind period and de-energized during the pause period, includes one of the two contacts associated with the contactor R–3, which contact is directy connected to the D.C. lead 316 and includes a wire 332 that connects the other of the two contacts with one side of the oscillation clutch 272. The other side of the oscillation clutch 272 is directly connected to the second D.C. lead 318. Everything to the left of clutch 272 in FIG. 9a is stationary during the pause period and is rotating during the wind period.

When the relay coil R is energized, contactors R–2 and R–3 de-energize the dwell brake 263 and the oscillation clutch 272, respectively, thus terminating the wind period, and energize the dwell clutch 236 and the oscillation brake 294, respectively, which starts the dwell period. The circuit through the dwell clutch 236 includes one of the two contacts associated with the contactor R–2, which contact is directly connected to the D.C. lead 316, and includes a wire 334 that connects the other of the two contacts with the dwell clutch. The other side of the dwell clutch 236 is directly connected to the second D.C. lead 318. The circuit for energizing the oscillation brake 294 includes one of the two contacts associated with the contactor R–3, which contact is connected directly to the D.C. lead 316, and includes a wire 336 that connects the second contact with the oscillation brake. The other side of the oscillation brake is directly connected to the second D.C. lead 318.

It is apparent that the dwell brake 263 and the oscillation clutch 272 are normally energized during a winding cycle, the dwell brake being effective to immobilize the dwell timing cam 256 and the oscillation clutch being engaged for actuation of both the oscillation crank 288 and the master dwell cam 305. At the end of a predetermined winding cycle, the master dwell cam 305 closes the master dwell cam switch 310 and the dwell-selector cam 276 closes either the left dwell switch 282 or the right dwell switch 285 to energize the relay coil R.

The relay, which locks itself, de-energizes both the dwell brake 263 and the oscillation clutch 272 and energizes both the dwell clutch 236 and the oscillation brake 294. Energization of the dwell clutch 236 causes actuation of the normally idle dwell-timing cam 256 and energization of the oscillation brake 294 stops both the oscillation crank 288 and the master dwell cam 305. The arrangement is such, however, that the master dwell cam 305 in coming to a stop coasts sufficiently to carry the cam lug 306 beyond the operating arm 308 of the master dwell cam switch 310, so that the master dwell cam switch 310 remains closed momentarily.

The dwell timing cam 256 rotates to a predetermined extent, and then opens the normally closed dwell timing cam switch 262 to break the relay circuit. Breaking the relay circuit to restore the contactors R–1, R–2 and R–3 to their normal positon restores normal operation for the next winding cycle.

The lug 278 of the dwell-selector cam 276 operates the left dwell switch 282 and the right dwell switch 285 alternately at the ends of the successive winding cycles. Thus, at the end of one winding cycle, the crank-pin 289 of the crank is stopped at the extreme right position shown in FIG. 9a, and at the end of the next winding cycle it is stopped at a diametrically opposite leftward position. Consequently, one winding cycle terminates with all of the idler rollers 114 at their extreme rightward positions of oscillation and the next winding cycle terminates with all the idler rollers in their extreme leftward positions of oscillation.

For a more detailed description of the method and the mathematical analysis of the winding cycle, reference is made to application S.N. 754,551, filed October 12, 1958, entitled Ball Winding Method and Apparatus, now abandoned, which is a continuation-in-part application of the still earlier abandoned application S.N. 513,280, filed June 6, 1955, for Ball Winding Method and Apparatus, S.N. 754,551 having now been re-filed as continuation-in-part application S.N. 254,041, filed January 23, 1963, and entitled Ball Winding Method and Apparatus. See also continuation-in-part application S.N. 635,514, filed January 22, 1957, entitled Ball Winding Apparatus, now U.S. Patent. 3,071,331, issued January 1, 1963.

In the light of the description of the method of winding the cord given in this specification, it could be summarized briefly as follows: a constant amplitude and a constant direction velocity vector is applied to the periphery of the ball by the synchronous motor 235 by means of wheel 112. This first velocity vector produces a constant angular velocity rotation of the ball around axis 215, illustrated in FIG. 18. The oscillating rollers 114 introduce an additional variable amplitude velocity vector, which is the second velocity vector. This second velocity vector is at right angles to the first velocity vector, is lying in the plane passing through the axes 216 and 215 and the center of the ball, is parallel to the axes 216 and 215 and is also applied to the periphery of the ball. The second vector has a variable amplitude and it also changes its sign. The amplitude changes from zero amplitude to a positive maximum amplitude and then decreases again to the zero amplitude, whereupon it then changes its sign from plus to minus, the change in direction being directly opposite to the direction of the positive value of this vector. This negative amplitude increases to a maximum value and then decreases again to zero, whereupon it becomes again positive. From the description of the second velocity vector, it follows that it has positive and negative amplitudes, the positive and negative amplitudes having diametrically opposite directions with absolute values of the maximum negative amplitude and the maximum positive amplitude being equal to each other. All of the above can be summarized simply by stating that the magnitude of the second velocity vector varies or follows a sinusoidal wave, this sinusoidal wave and this variation in the magnitude in the second velocity vector being produced by the oscillation of rod 212. Rod 212 has a variable linear velocity, the magnitude of which also follows a sinusoidal wave. This sinusoidal wave variation is produced by the crank shaft 289 connected to a constant or substantially constant speed motor 275. Moreover, the period of the sinusoidal wave is made substantially equal to the period required for obtaining 360° rotation of the ball around axis 215, and it is because of the above relationship of the two periods that one obtains the so-called "polarized" winding illustarted in FIG. 1, i.e., the winding in which the individual turns 1–6 intersect the two polar regions P and P′ in the manner described previously. Hence the reason for the statment in the mathemetical analysis of the method, gven in the parent case, where it is stated that the time period T, for rotation of the ball about the first axis, which is axis 215, with respect to the period of time, $T_1$, for the oscillation of said ball about said second axis, which is axis 216, has the limitation of $$\frac{T}{T_1}=1\pm0.05$$

It is to be understood that the wound layer is not necessarily the carcass layer of the ball. In face, a feature of one practice of the invention is the use of a winding technique to form an outer, inner and/or under cover layer, this technique having special usefulness in providing ball covers of materials that cannot be applied by existing methods. The winding material used in this particular practice of the invention should be uncured when applied and then cured. Suitable material for this purpose include vinyl resins, polyesters, rubber latex and moldable nylon.

My description in specific detail of selected practices and embodiments of the invention, by way of example and to illustrate the underlying principles, will suggest various changes, substitutions and other departures from my disclosure that properly lie within the spirit and scope of the appended claims.

Thus, this invention is also applicable for grinding and polishing spherical objects, such as bowling balls, in which case the ball rotating mechanism is used in conjunction with a linearly moving abrasive belt.

What is claimed is:

1. A method of winding a ball, including the steps of rotating the ball around a first axis; feeding a strand to the ball to be wound thereon by the rotation of the ball around said first axis; and simultaneously rotating said ball about a second axis, with the rotation of said ball around said second axis being synchronized with the rotation of said ball around said first axis, and repeating said simultaneous rotation about said first and second axes to cause a wind period during which successive turns approximate great circles and are angularly displaced to intersect at a pair of diametrically opposite polar regions of the ball due to the simultaneous rotation of said ball about the first and the second axes; periodically interrupting the rotation of said ball around said second axis to terminate said wind period and simultaneously begin a pause period, rotating said ball only around said first axis during said pause period for a fraction of a turn of said ball around said first axis, and immediately thereafter initiating a succeeding wind period with a succeeding pair of polar regions angularly disposed from the preceding pair of polar regions.

2. The method of mainipulating a body having a spherical surface, said method comprising the steps of: rotating said body substantially continuously in the same direction about a first axis fixed in space; rotating said body about a second axis fixed relative to said body and perpendicular to said first axis first in one direction for approximately one-half revolution of said body about said first axis; and subsequently rotating said body about said second axis in a direction opposite said one direction for approximately an immediately succeeding one-half revolution of said body about said first axis, whereby said body is rotated periodically in only one direction about said second axis.

3. The method of winding a plurality of angularly spaced turns of a filamentary material approximately over diametrically opposed areas on a spherical body, said method comprising the steps of: rotating said body substantially continuously in the same direction about a first axis fixed in space; simultaneously rotating said body about a second axis fixed relative to said body and perpendicular to said first axis first in one direction of approximately one-half revolution of said body about said first axis; subsequently rotating said body about said second axis in a direction opposite said one direction for approximately an immediately succeeding one-half revolution of said body about said first axis, whereby said body is rotated periodically in only one direction about said second axis; and feeding said filamentary material onto the surface of said body approximately at a point lying in a plane passing through the center of said body and being perpendicular to said first axis to wind a complete turn, approximating a great circle, of said material on said body during one complete revolution of said body around said first axis, and repeating said simultaneous rotation of said body about said first and second axes to wind a plurality of said turns angularly spaced from each other by equal angles and forming two polar regions at two diametrically opposed regions on the surface of said ball.

4. The method of winding a cord on a spherical object for producing a reinforcing winding on the surface of said object which includes the steps of: feeding said cord onto said object from a fixed point, rotating said object for a first interval of time around a first axis and simultaneously oscillating said object around a second axis passing through the center of said object and being perpendicular to the first axis; said oscillations being timed with respect to the rotation of said object around the first axis and continued for said first interval of time so as to produce a first series of turns having two diametrically opposite polar regions defined by the intersections of the successive turns—belonging to said first series—of said cord on the surface of said object; stopping the oscillation of said object around the second axis for a second predetermined interval of time while continuing the rotation of said object along the first axis so as to make said cord follow a circular path on the surface of said object; resuming again thereafter the oscillation of said object around the second axis for producing a second similar series of turns on the surface of said object; and repeating the above described rotation and oscillation of said object a number of times for completing the winding of said object.

5. The method as defined in claim 4 in which said first and second intervals of time constitutes a single program cycle, said complete winding being obtained by including a plurality of program cycles.

6. The method as defined in claim 4 in which the time period, T, for rotation of said object about the first axis with respect to time period, $T_1$, for the oscillation of said object about the second axis has the following limits:

$$\frac{T}{T_1}=1\pm0.05$$

7. The method as defined in claim 4, wherein said cord is guided on to the surface of the object from said point, said point lying approximately in a plane perpendicular to said first axis and passing through the center of said object.

8. The method as defined in claim 4, wherein an adhesive is sprayed on to said object approximately at the point of initial contact of said cord therewith to facilitate bonding said cord to said object.

9. A method of rotating a spherical body which includes the steps of supporting the geometric center of said body at a fixed point in space, continuously imparting to the outer periphery of said ball at a fixed point in space a first constant rotational velocity vector, and applying to said ball and through said ball to said first vector a second variable velocity vector having a variable amplitude and positive and negative signs, the absolute magnitudes of the positive and negative amplitudes of the second vector being equal to each other and pointing in diametrically opposite directions.

10. The method as defined in claim 9 in which the variable amplitude of said second vector follows a substantially sinusoidal wave form.

11. The method as defined in claim 10 in which the period of said sinusoidal wave is substantiallly equal to the period of rotation of said ball produced by said first vector.

12. The method as defined in claim 9 in which said first and second vectors are at right angles to each other.

References Cited

The following references, cited by the Examiner, are of record in the patented file of this patent or the original patent.

UNITED STATES PATENTS

| | | | |
|---|---|---|---|
| 1,270,009 | 6/1918 | Cobb | 242—3 |
| 2,171,607 | 9/1939 | Sibley | 242—3 |
| 2,311,339 | 2/1943 | Huse | 242—3 |
| 2,995,311 | 8/1961 | Holman | 242—3 |

STANLEY N. GILREATH, Primary Examiner